US009828877B2

United States Patent
Riviere et al.

(10) Patent No.: US 9,828,877 B2
(45) Date of Patent: Nov. 28, 2017

(54) TURBOJET ENGINE COLD STREAM FLOW PATH SUSPENDED FROM THE EXHAUST CASE BY RADIAL CREVICE MOUNTS AND LINK RODS

(75) Inventors: Thomas Gérard Daniel Riviere, Noisy le Grand (FR); François Robert Bellabal, Fontainebleau (FR); Olivier Renon, Courpalay (FR); Guilhem Seize, Cachan (FR)

(73) Assignee: SNECMA, Paris (FR)

( * ) Notice: Subject to any disclaimer, the term of this patent is extended or adjusted under 35 U.S.C. 154(b) by 583 days.

(21) Appl. No.: 14/116,597

(22) PCT Filed: May 7, 2012

(86) PCT No.: PCT/FR2012/051011
§ 371 (c)(1),
(2), (4) Date: Nov. 8, 2013

(87) PCT Pub. No.: WO2012/153056
PCT Pub. Date: Nov. 15, 2012

(65) Prior Publication Data
US 2014/0112770 A1    Apr. 24, 2014

(30) Foreign Application Priority Data
May 9, 2011    (FR) .................................... 11 53946

(51) Int. Cl.
*F01D 25/24*    (2006.01)
*F01D 25/16*    (2006.01)
*F02C 7/20*    (2006.01)

(52) U.S. Cl.
CPC .......... *F01D 25/243* (2013.01); *F01D 25/162* (2013.01); *F02C 7/20* (2013.01); *Y02T 50/672* (2013.01)

(58) Field of Classification Search
CPC .......... F01D 25/162; F01D 25/243; F02C 7/20
See application file for complete search history.

(56) References Cited

U.S. PATENT DOCUMENTS 2,936,978 A * 5/1960 Lauck .................... B64D 27/12
                                                    248/555
3,540,682 A * 11/1970 Howard .................. F01D 5/022
                                                    244/53 R (Continued)

FOREIGN PATENT DOCUMENTS

| EP | 1 902 952 | 3/2008 |
| EP | 1 930 556 | 6/2008 |
| WO | 2010 007226 | 1/2010 |

OTHER PUBLICATIONS

International Search Report dated Jul. 4, 2012 in PCT/FR12/051011 Filed May 7, 2012.

*Primary Examiner* — Justin Seabe
(74) *Attorney, Agent, or Firm* — Oblon, McClelland, Maier & Neustadt, L.L.P.

(57) ABSTRACT

A bypass turbojet engine including a cylindrical cold stream flow path supported by link rods which are attached to a cylindrical outer shell ring of an exhaust case at attachment points. The attachment points for the exhaust case are crevice mounts including lugs that extend radially from the outer shell ring, a bore of the crevice mounts being directed in a direction of generatrices of the outer shell ring.

4 Claims, 2 Drawing Sheets

(56) References Cited

U.S. PATENT DOCUMENTS

| | | | | |
|---|---|---|---|---|
| 4,979,872 A | * | 12/1990 | Myers | F01D 9/065 |
| | | | | 403/131 |
| 5,226,288 A | * | 7/1993 | Cornax | F02C 7/20 |
| | | | | 60/226.1 |
| 6,547,518 B1 | * | 4/2003 | Czachor | F01D 9/044 |
| | | | | 415/137 |
| 2007/0246603 A1 | * | 10/2007 | Udall | B64D 27/20 |
| | | | | 244/54 |
| 2008/0072572 A1 | | 3/2008 | Beutin et al. | |
| 2008/0134688 A1 | | 6/2008 | Somanath et al. | |
| 2010/0287950 A1 | * | 11/2010 | Heyerman | F02C 7/20 |
| | | | | 60/797 |
| 2011/0168837 A1 | | 7/2011 | Balk et al. | |

\* cited by examiner

TURBOJET ENGINE COLD STREAM FLOW PATH SUSPENDED FROM THE EXHAUST CASE BY RADIAL CREVICE MOUNTS AND LINK RODS

The field of the present invention is that of turbojet engines and of the members that provide the connection between the various component parts thereof. It relates more particularly to the members that ensure the mechanical integrity of the cold stream flow path in dual flow (bypass) turbojet engines.

An engine, such as a turbojet engine, may be mounted at various points on the airplane, by attachment to a strut or pylon belonging to the structure of this airplane. It may thus be suspended under the wing structure, fixed to the fuselage, generally at the rear, or mounted in the tail assembly by appropriate means of attachment. These attachment means have the function of transmitting mechanical load between the engine and the structure of the airplane. The loads to be taken into consideration are notably the weight of the engine along the vertical axis Z, its thrust along the axis X of the engine, and lateral aerodynamic loadings along the transverse axis Y. The loads to be transmitted also include the need to react to the rotational torque about the axis of the engine. These means also need to be able, without transmitting to the strut, to absorb the deformations experienced by the engine during the various phases of flight as a result, for example, of dimensional variations caused by thermal expansion or contraction.

One method of suspension, for example in the case of a turbofan engine, is to attach the engine to a strut belonging to the structure of the wing of the airplane using a forward suspension or attachment and a rear suspension or attachment. The forward suspension is fixed in particular to the intermediate case downstream of the fan case and the rear suspension to the primary flow exhaust case. These two components constitute the structural parts of a turbomachine, via which all forces are absorbed. Modern turbojet engines are dual flow turbomachines with a high bypass ratio, the secondary or bypass air stream being compressed by a single compressor stage referred to as a fan. On leaving this stage, it is guided via a duct directly into a nozzle to contribute to the thrust developed by the engine. It thus flows between the main spool of the engine, delimited by casings, and a cold stream flow path (generally denoted by its English-language acronym OFD which stands for outer fan duct). For weight reasons, this duct is commonly made of a composite material. This duct is fixed to the engine by connections situated at its two longitudinal ends, a first fixing taking place upstream on the case surrounding the fan and a second at the rear to a support ring borne by the exhaust case.

The connection between the support ring and this exhaust case is generally achieved using arms that pass across the cold stream. In more recent embodiments it may also be performed using profiled link rods attached, on the one hand, to the outer fan duct and, on the other hand, to the exhaust case, allowing a significant saving in the amount of weight dedicated to this connection. In this case of link rod attachment, connection is made using a latticework of link rods, generally six or eight of these, aligned in pairs, which are attached at three or four points to the support ring, as depicted in FIG. 2.

Link rods which are attached to the exhaust case by means of assemblies consisting, on the exhaust case, of a pin running radially from the case and, on the link rod, of a bore made in one of its ends are known in the prior art. While such an assembly gives the link rod a degree of freedom to rotate in a plane tangential to the case and allows relative axial movements of the case and of the outer fan duct as a result of expansion, it does require the addition of bosses and inserts on the exhaust case, and the use of inserts and of a screw for bearing load. As a result, it has the disadvantage of having a high number of part references to manage and of being more complex to service.

It is an object of the present invention to overcome these disadvantages by proposing a type of connection between the ring that bears the outer fan duct and the exhaust case that does not have the disadvantages of the prior art and which offers more possibilities for relative movements of the exhaust case with respect to the outer fan duct.

To this end, the subject of the invention is a bypass turbojet engine comprising a cylindrical outer fan duct borne by link rods attached to a cylindrical outer shell ring of an exhaust case at attachment points, characterized in that the attachment points of the exhaust case are clevis mounts the lugs of which extend radially from said outer shell ring, the bore of said clevis mounts being oriented in the direction of the generatrices of the outer shell ring.

This clevis mount gives the latticework of link rods a degree of freedom in a radial plane to deform and prevent excessive loads from being passed through the link rods.

Advantageously, the link rods meet said outer fan duct at a tangent, or near tangent, to said outer shell ring. The tangential direction allows load transmitted by the link rods to the exhaust case to be directed along the neutral axis of the shell ring of the exhaust case. Ideally, the direction is perfectly tangential to the shell ring but it may, for reasons of mechanical integration of the assembly, diverge slightly from this ideal direction.

For preference, there are even number of clevis mounts combined in twos into a pair and positioned on the circumference of the outer shell ring so that the link rods fixed to two associated clevis mounts meet one and the same point on said outer fan duct. This arrangement makes relative deformations of the outer fan duct and of the exhaust case easier and thus contributes to reducing the load passing through the link rods.

Advantageously, the clevis mounts are positioned in such a way that each of the clevis mounts of one and the same pair is positioned next to one of the clevis mounts of an adjacent pair.

In one particular embodiment, the number of pairs of clevis mounts is equal to 3, all of the link rods together forming a triangle the vertices of which are situated on said outer fan duct.

In another embodiment, the number of pairs of clevis mounts is equal to 4, all the link rods together forming a square the vertices of which are situated on said outer fan duct.

Advantageously, the exhaust case has at least one depression on its circumference, in the bottom of which depression the corresponding clevis mount is positioned in such a way that the bore of said clevis mount is aligned with the cylinder formed by said shell ring on either said depression. In this way, loading passing through the link rod is transmitted to the exhaust case without a lever arm and, therefore, without a torque which would be detrimental to the mechanical integrity of the clevis mounts holding fast on the case.

For preference, the points of attachment of the link rods to the outer fan duct are situated axially upstream of the clevis mounts of the outer shell ring of the exhaust case. This configuration allows a primary spool of the engine to lengthen under the effect of an expansion that is greater than that of the outer fan duct, with a simple stretching of the link rods and without any radial loading that would have arisen, if such were not the case, with a hard point associated with the transition when its points of attachment on the case and on the duct are radially aligned.

Advantageously, the bore of the clevis mounts is oriented along the axis of rotation of the turbojet engine and the linked rods are ball-ended link rods which allows them some axial travel with respect to said clevis mounts.

The invention also describes a turbojet engine exhaust case comprising a cylindrical outer shell ring, on the circumference of which attachment points are positioned for link rods intended to support the outer fan duct of said turbojet engine, for which at least one of said attachments is a clevis mount the lugs of which extend radially from said outer shell ring.

This clevis mount gives the latticework of link rods a degree of freedom, in a radial plane, to deform and prevent excessive load from being developed in the link rods.

The bore of said clevis mount is advantageously oriented in the direction of the generatrices of the outer shell ring.

Said outer shell ring preferably comprises at least one depression on its circumference, in the bottom of which depression the clevis mount is positioned in such a way that its bore is aligned with the cylinder formed by said shell ring on either said depression.

The invention will be better understood and other objects, details, features and advantages thereof will become more clearly apparent during the course of the explanatory detailed description which will follow, of one or more embodiments of the invention which are given by way of purely illustrative and nonlimiting examples with reference to the attached schematic drawings.

Figure 1:
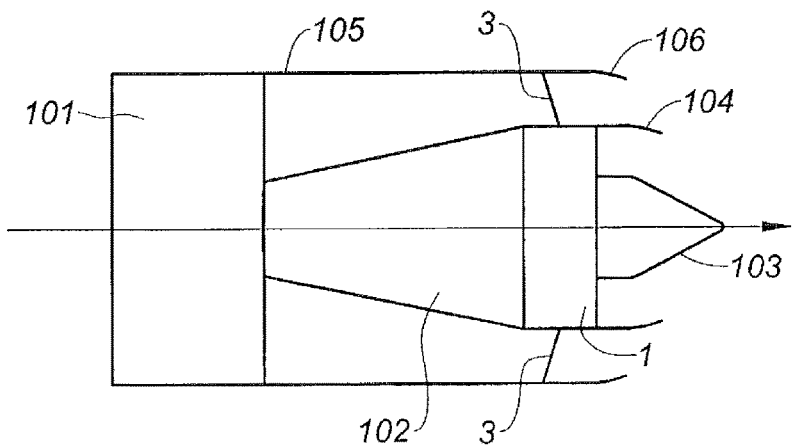
FIG. 1 is a schematic view of a bypass turbojet engine with a link rod connection between the exhaust duct and the outer fan duct.

FIG. 1 is a stylized depiction of a bypass turbojet engine comprising a fan 101, a primary core 102 comprising at its downstream end an exhaust case 1 that contributes to the structure of the engine, and a tail cone 103. The primary flow, which passes through the primary core, is ejected in a primary nozzle 104 surrounding the tail cone while the secondary or bypass flow, from the fan, is guided downstream thereof by an outer fan duct 105 ending in a secondary nozzle 106. The outer fan duct 105 is attached to the exhaust case 1 by a latticework of link rods 3 which are inclined with respect to a radial plane of the engine, the attachment to the outer fan duct being positioned upstream of the attachment to the exhaust case.

Figure 2:
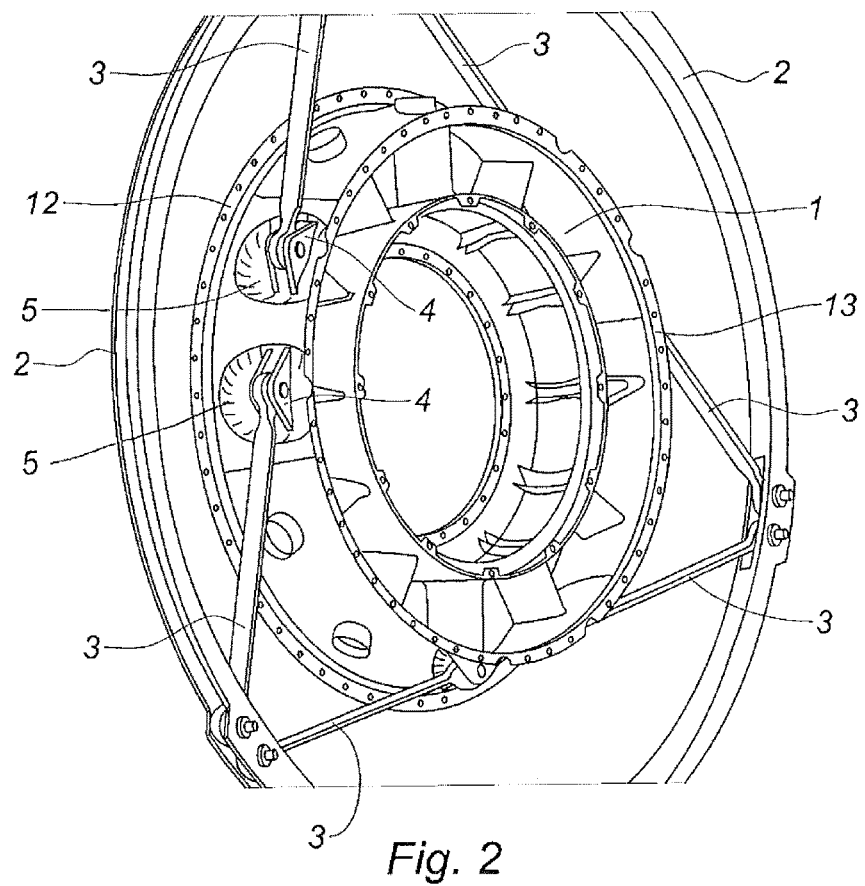
FIG. 2 is a perspective view of an exhaust case according to one embodiment of the invention, connected by a latticework of link rods to an outer fan duct support ring of a turbojet engine.

FIG. 2 shows the exhaust case 1 surrounded by a support ring 2 intended, on the downstream side, to hold the outer fan duct 105 of this turbojet engine. Loadings associated with this retention are transmitted to the exhaust case by a set of six link rods 3 which are fixed at one of their ends to the ring 2 and at the other end to the exhaust case 1 by fixings in the form of clevis mounts. As depicted in the figure, the link rods 3 are arranged, in pairs, tangentially to the exhaust case 3 and thus form a triangle the vertices of which are situated on the support ring 2. They have a rectilinear shape, extending between two eye-shaped end parts which are intended to accept the pins of clevis mounts which are positioned, in the case of one of them, on the exhaust case 1, and, in the case of the other, on the support ring 2. Each eye is bored and fitted with a wall swivel part through which the pin of the corresponding clevis mount passes, giving the link rod a degree of freedom to rotate in a plane tangential to the exhaust case 1. As for the rectilinear part thereof, this is flattened so that it can be profiled to offer the least possible resistance to the stream of secondary air across which they pass. For the purposes of reducing costs by standardizing components in the turbomachine, the link rods 3 exhibit symmetry with respect to the mid-plane of their rectilinear part, the eyes having the same shape and the profile of the rectilinear part having a symmetric profile; thus, each eye can equally be positioned at the exhaust case 1 or at the support ring 2.

Figure 3:
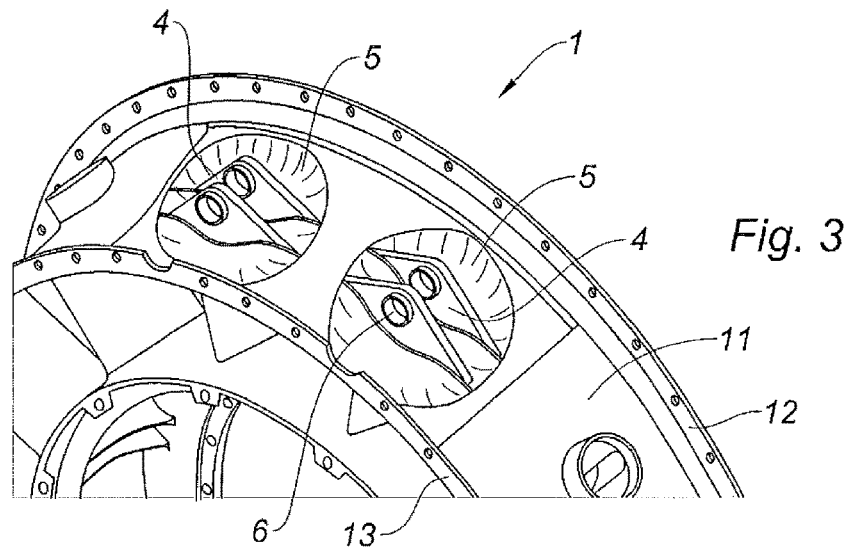
FIG. 3 is a detailed view of the exhaust case of FIG. 2.

FIG. 3 shows a sector of the exhaust case 1, with its outer shell ring 11 delimited by an upstream flange 12 and a downstream flange 13 for attaching it to the contiguous parts of the primary core 102. The outer shell ring 11 has six clevis mounts 4 on its circumference, these being positioned in side-by-side pairs and serving as points of attachment for the link rods 3 that hold the outer fan duct 105, as described hereinabove. For the sake of the mechanical integrity of the exhaust case 1, the clevis mounts are positioned facing arms of this case which pass across the primary flow and secure the outer shell ring to an inner shell ring and to the internal parts that bear the bearings in which the shafts rotate.

The lugs of these clevis mounts 4 are oriented radially with respect to the shell ring 11, and extend on the circumference thereof in such a way that the pin (not depicted) that passes through them runs in a substantially axial direction (with reference to the axis of rotation of the engine). This configuration gives the link rods 3 a degree of freedom in the radial plane allowing the triangle formed by the six link rods to deform and prevent these link rods from having to bear bending loads. Their dimension can therefore be calculated without having to take such bending loads into consideration, thereby allowing a corresponding reduction in their mass.

Figure 4:
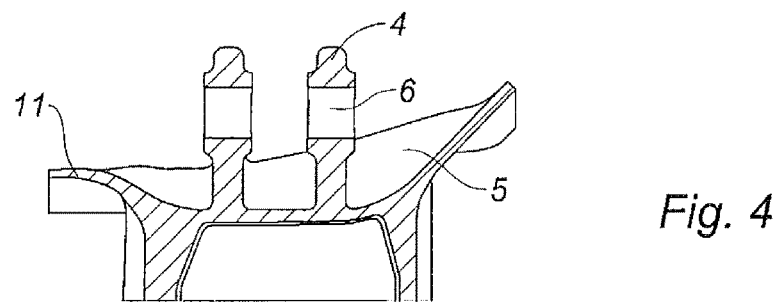
FIG. 4 is a view in part section of the exhaust case of FIG. 2.

It should be noted that, in the embodiment depicted in FIGS. 3 and 4, each clevis mount is positioned in a depression 5 made in the outer shell ring 11. FIG. 4 shows, in greater detail, how a clevis mount 4 is positioned in this depression 5. The outer shell ring 11, the overall shape of which is more or less a cylinder of revolution about the axis of rotation of the engine, has, at the point at which the six link rods 3 are attached, an indentation that forms a depression 5 extending, circumferentially, on either side of the clevis mount 4 and, axially, from the middle of the shell ring toward its upstream 12 and downstream 13 flanges. The lugs of the clevis mount are thus fixed to the shell ring in the bottom of this depression, which has the effect of lowering the bore 6 of the clevis mount 4 and of bringing it radially closer to the radius of the shell ring 11 in the regions where the depression is not present. Because of this depression, the link rod 3, which is fixed to the clevis mount 4 by a pin passing through the bore 6, applies its tensile or thrusting force in a direction tangential to the circumference of the shell ring 11, meaning the circumference away from the depression. The shell ring reacts these loads directly in the direction of its axes rather than at an offset which would create a lever arm and a torque detrimental to its mechanical integrity.

Figure 5:
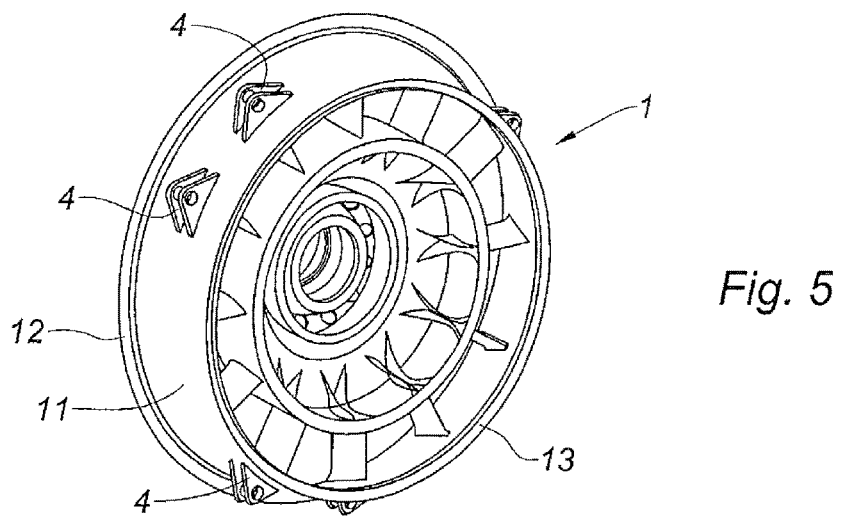
FIG. 5 is a perspective view of an exhaust case according to a second embodiment of the invention.

FIG. 5 depicts an alternative form of a shell ring according to the invention. In this second embodiment, the clevis mounts 4, once again, extend along the circumference of the outer shell ring 11 and have their lugs oriented radially. By contrast, for the sake of simpler manufacture of the exhaust case 1, the outer shell ring 11 has no depression where the clevis mounts 4 are attached. These mounts project from the circumference, maintaining an orientation that directs their bores axially. The penalty incurred through the creation of a lever arm for the loadings transmitted via the link rod 3 is compensated for by the greater ease of manufacture and the associated cost benefit.

In order to provide the set of link rod latticework with a freedom of movement in the axial direction and thus allow expansion of the primary core which, in use, runs at a higher temperature than the outer fan duct, the link rods 3 are oriented so that they are not perfectly radial at the time of fitting. The attachments of these link rods to the outer fan duct 105, i.e. in fact the location of the support ring 2, are positioned slightly upstream of the clevis mounts 4 of the exhaust case 1. This configuration, which has been exaggerated in FIG. 1, avoids excessive compressive stresses in the link rods 3 by allowing them to extend and mirror the rearward movement of the primary core. The expansion of the primary core, which in fact results in the exhaust case 1 moving back relative to the support ring 2 and, therefore results in a rotation of the link rods 3 in relation to their retaining clevis mounts, whether this be in a clevis mount borne by the support ring or in the clevis mount 4 of the exhaust case 1. This movement is rendered possible, on the one hand, by the longitudinal elasticity of the rectilinear part of the link rod and, on the other hand, by the fact that it is a ball-ended link rod, i.e. that a ball end provides the connection between the rectilinear part and the eye of the link rod.

The invention claimed is:

1. A bypass turbojet engine comprising:
a cylindrical outer fan duct borne by six link rods attached to a cylindrical outer shell ring of an exhaust case at attachment points, said attachment points of the exhaust case consisting of six clevis mounts including lugs that extend radially from the outer shell ring, a bore of the clevis mounts being oriented in a direction of generatrices of the outer shell ring,
wherein said link rods are arranged tangentially to said outer shell ring of said exhaust case so that said link rods meet the outer fan duct at a tangent to the outer shell ring,
wherein the attachment points of the link rods to the outer fan duct are situated axially upstream of the clevis mount of the outer shell ring of the exhaust case,
wherein the six clevis mounts are positioned on the circumference of the outer shell ring in three pairs of clevis mounts so that all of the link rods form a triangle with vertices situated on the outer fan duct, each vertex of the triangle including two link rods which are fixed to clevis mounts of adjacent pairs of clevis mounts, and
wherein the link rods present a rectilinear shape with a ball part between each eye-shaped end part of the link rod.

2. The turbojet engine as claimed in claim 1, wherein the exhaust case includes at least one depression on its circumference, in a bottom of which depression the corresponding clevis mount is positioned such that the bore of the clevis mount is aligned with the cylinder formed by the shell ring on the at least one depression.

3. The turbojet engine as claimed in claim 1, wherein the bore of the clevis mounts is oriented along an axis of rotation of the turbojet engine.

4. The turbojet engine as claimed in claim 1, wherein a circumferential distance between the clevis mounts in one of the pairs of clevis mounts is less than a circumferential distance between the clevis mounts of adjacent pairs of clevis mounts.

* * * * *